(12) United States Patent
Javeri et al.

(10) Patent No.: US 12,030,504 B2
(45) Date of Patent: Jul. 9, 2024

(54) SYSTEMS AND METHODS FOR ANALYZING DRIVING BEHAVIOR TO IDENTIFY DRIVING RISKS USING VEHICLE TELEMATICS

(71) Applicant: Verizon Patent and Licensing Inc., Basking Ridge, NJ (US)

(72) Inventors: Vipul Shyam Javeri, Sandy Springs, GA (US); Mourya C. Darivemula, Sugar Hill, GA (US); Aaroon Thowfiq Shahul Hameed, Alpharetta, GA (US); Nishitha Reddy Nalla, Atlanta, GA (US); Jeyanth John Britto, Alpharetta, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 296 days.

(21) Appl. No.: 17/211,234

(22) Filed: Mar. 24, 2021

(65) Prior Publication Data

US 2022/0306125 A1     Sep. 29, 2022

(51) Int. Cl.
*B60W 40/09*     (2012.01)
*B60W 40/10*     (2012.01)
*G06N 20/00*     (2019.01)
*H04W 4/029*     (2018.01)
*H04W 12/80*     (2021.01)
*B60W 40/08*     (2012.01)

(52) U.S. Cl.
CPC ............ *B60W 40/09* (2013.01); *B60W 40/10* (2013.01); *G06N 20/00* (2019.01); *H04W 4/029* (2018.02); *H04W 12/80* (2021.01); *B60W 2040/0863* (2013.01); *B60W 2420/403* (2013.01)

(58) Field of Classification Search
CPC ................ B60W 40/09; B60W 40/10; B60W 2040/0863; B60W 2420/42; B60W 2420/403; H04W 4/029; H04W 12/80; G06N 20/00; G06Q 40/08
See application file for complete search history.

(56) References Cited

U.S. PATENT DOCUMENTS

| | | | | |
|---|---|---|---|---|
| 11,325,607 | B1* | 5/2022 | Sanchez ................ | G07C 5/085 |
| 11,348,186 | B1* | 5/2022 | Kanevsky ............. | G06Q 40/08 |
| 11,518,391 | B1* | 12/2022 | Sanchez ................ | G06F 18/23 |
| 11,518,392 | B1* | 12/2022 | Sanchez ................ | G06Q 40/08 |
| 2020/0104874 | A1* | 4/2020 | Chintakindi ......... | A61B 5/0022 |
| 2021/0181753 | A1* | 6/2021 | Likhterman ...... | B60W 60/0015 |

(Continued)

*Primary Examiner* — John A Tweel, Jr.

(57) ABSTRACT

In some implementations, a device may receive historical telematics data associated with a vehicle. The device may determine a set of base line driving parameters based on the historical telematics data. The device may receive current telematics data associated with the vehicle. The device may determine a set of current driving parameters based on the current telematics data. The device may determine, based on processing the set of base line driving parameters and the set of current driving parameters with a machine learning model, a type of driving behavior of a driver of the vehicle. The device may determine, based on processing the set of base line driving parameters and the set of current driving parameters with another machine learning model, a severity score associated with the type of driving behavior. The device may perform an action based on the type of driving behavior and the severity score.

20 Claims, 10 Drawing Sheets

(56) References Cited

U.S. PATENT DOCUMENTS

2021/0309124 A1\* 10/2021 Fields ............... B60W 30/0953
2022/0126840 A1\* 4/2022 Batra .................... B60W 50/14
2022/0292605 A1\* 9/2022 Sanchez ................ G06N 20/00

\* cited by examiner

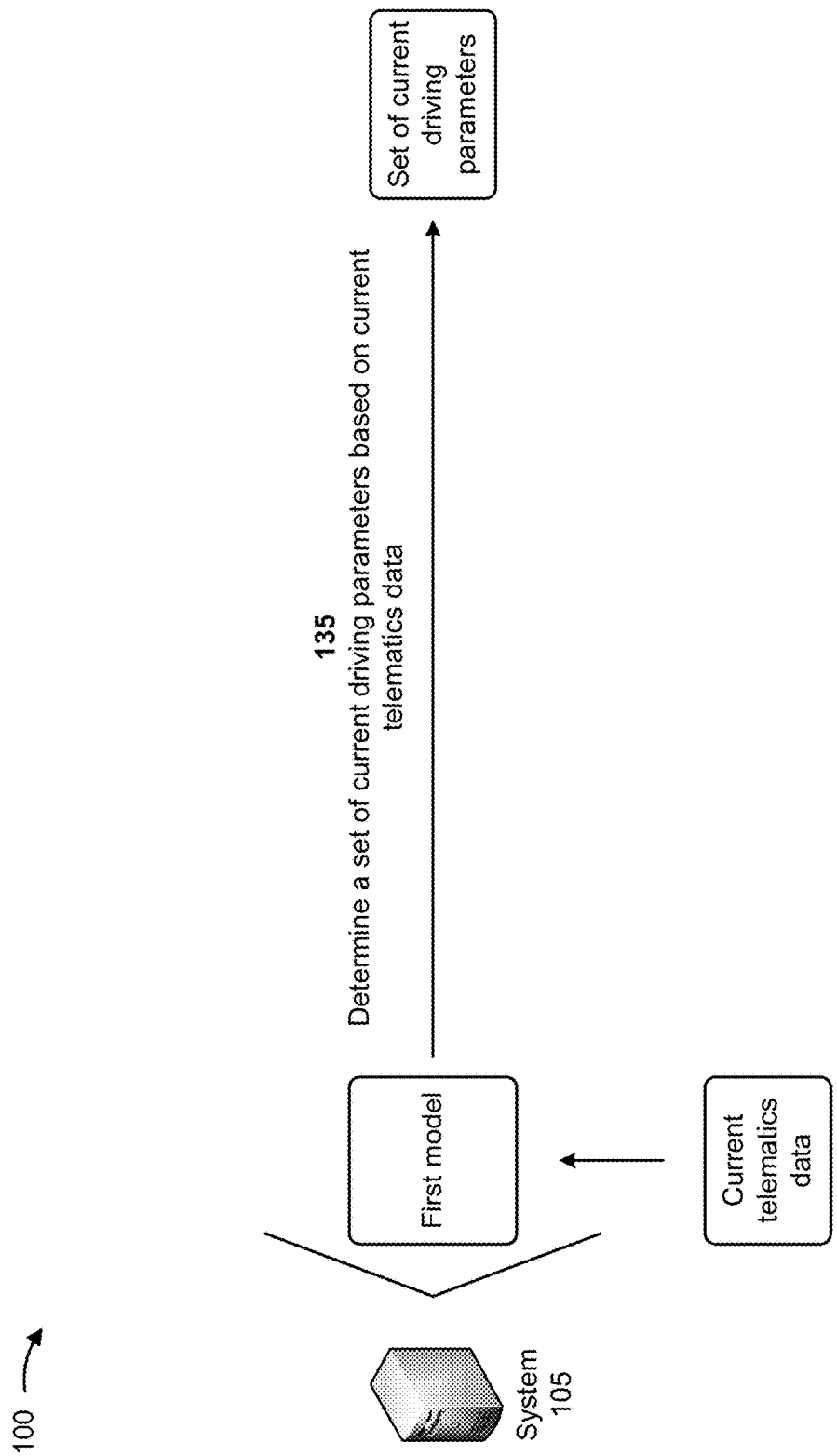

SYSTEMS AND METHODS FOR ANALYZING DRIVING BEHAVIOR TO IDENTIFY DRIVING RISKS USING VEHICLE TELEMATICS

BACKGROUND

Vehicles may be equipped with several devices that enable capture of sensor data, such as images or video surrounding the vehicle, engine parameters, vehicle operation parameters, and/or the like. For example, a vehicle may include a dash camera, several parking assist cameras, a backup assist camera, an on-board diagnostic (OBD) device, an electronic control unit (ECU), a global navigation satellite system (GNSS) device, and/or the like that enable capture of sensor data for different purposes.

BRIEF DESCRIPTION OF THE DRAWINGS

FIGS. 1A-1F are diagrams of an example associated with analyzing driving behavior to identify driving risks using vehicle telematics.

DETAILED DESCRIPTION OF PREFERRED EMBODIMENTS

Figure 1A:
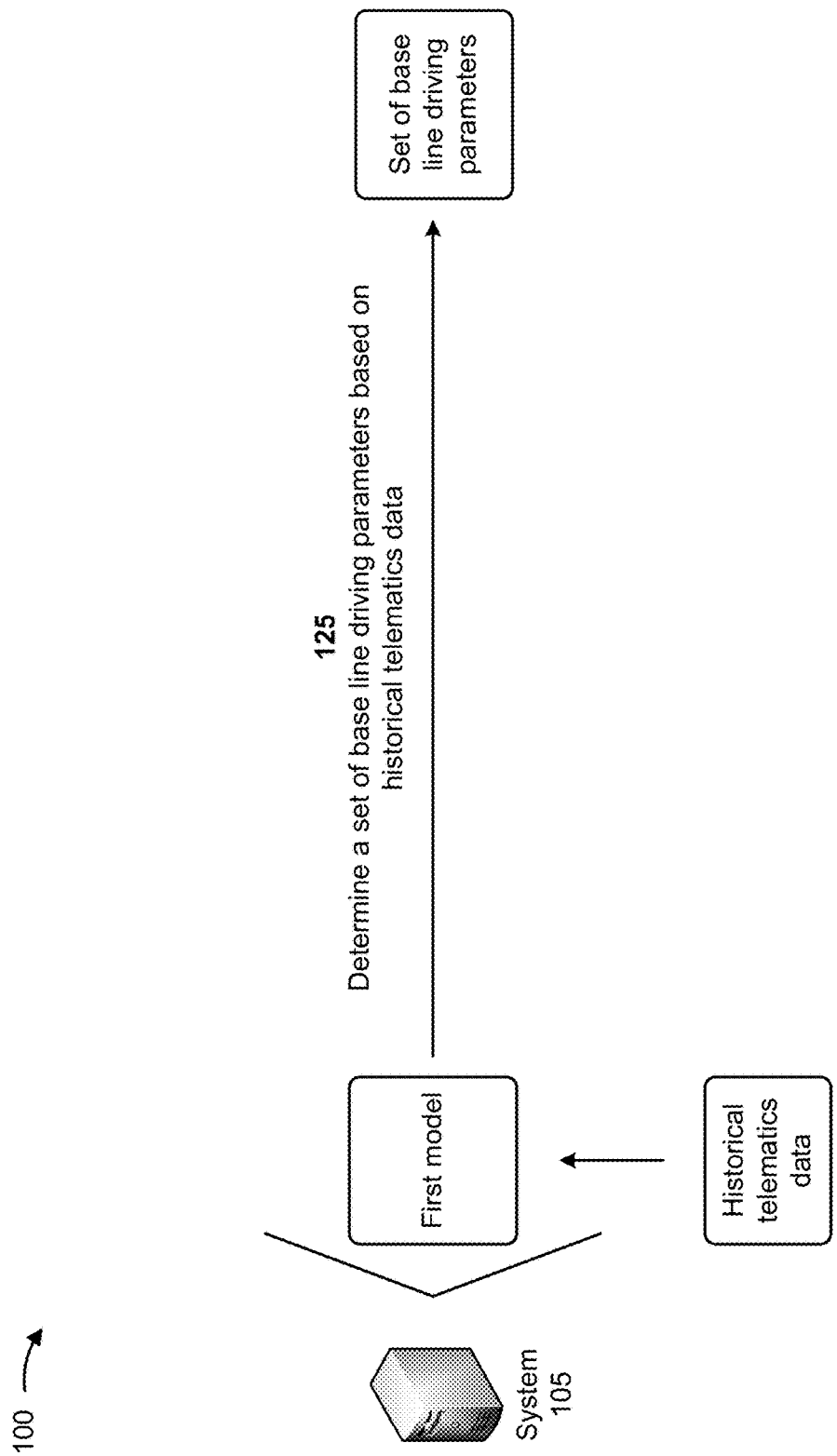

The following detailed description of example implementations refers to the accompanying drawings. The same reference numbers in different drawings may identify the same or similar elements.

While driving a vehicle, a driver may be influenced by a variety of factors that may cause the driver to exhibit a particular type of driving behavior. For example, a driver may experience a harsh driving event, such as a harsh braking event, a quick start event, a cornering event, a crash event, an off-road event, and/or the like based on being distracted (e.g., by a passenger in the vehicle), drowsiness, fatigue, stress, intoxication, driving while talking on a phone, making an erratic lane change, and/or the like. In some circumstances, the harsh driving event can create a dangerous situation for the driver, the vehicle, and/or other people and property. However, the driver might not be aware that he is influenced by factors that can lead to a harsh driving event. Moreover, fleet managers who employ numerous drivers might not know whether the drivers are being influenced by factors that can lead to a harsh driving event.

Some implementations described herein relate to a system configured to detect and/or prevent driving behaviors that may lead to a harsh driving event and/or promote safe driving behaviors. For example, the system may generate, based on historical telematics data associated with a first vehicle, a set of base line driving parameters. The system may receive current telematics data associated with a second vehicle. The second vehicle may be the same as, or different from, the first vehicle. The current telematics data may include accelerometer data indicating an acceleration of the second vehicle, gyroscope data indicating an orientation and/or an angular velocity of the second vehicle, steering wheel data indicating a position of a steering wheel of the second vehicle, brake pedal data indicating a position of a brake pedal of the second vehicle, gas pedal data indicating a position of a gas pedal of the second vehicle, location data indicating a location associated with the current telematics data, and/or phone usage data indicating usage of a mobile device by a driver of the second vehicle, among other examples. The angular velocity of the second vehicle may include an angular velocity associated with the vehicle turning and/or rotating. Alternatively, and/or additionally, the angular velocity of the second vehicle may include an angular velocity associated with a front end of the vehicle moving up or down as the second vehicle accelerates and/or decelerates, respectively.

The system may generate, based on the current telematics data, a set of current driving parameters associated with the second vehicle. The system may determine, based on the set of base line driving parameters and the set of current driving parameters, a type of driving behavior of a driver of the vehicle. The system may determine, based on the set of base line driving parameters and the set of current driving parameters, a severity score associated with the type of driving behavior.

The system may perform one or more actions based on the type of driving behavior and the severity score. For example, the system may provide a notification to a driver of the vehicle via a user device associated with the vehicle, to alert the driver of the type of driving behavior and/or the severity score. As another example, the vehicle may include an autonomous driving system and the system may cause the autonomous driving system to cause the vehicle to perform a particular action (e.g., brake, accelerate, turn the engine off, and/or the like) based on the type of driving behavior and/or the severity score.

In this way, implementations described herein provide drivers with information that can be used to change the driving behavior of the drivers. Furthermore, implementations described herein are automated and can capture and process numerous (e.g., hundreds, thousands, millions, billions, and/or the like) data points to classify numerous types of driving behaviors at the same time. This can improve speed and efficiency of the process and conserve computing resources (e.g., processor resources, memory resources, and/or the like) of the system. Furthermore, implementations described herein use a rigorous, computerized process to perform tasks or roles that were not previously performed or were previously performed using subjective human intuition or input.

Additionally, implementations described herein can allow the fleet managers to create safe driving training materials and/or guidelines, which can promote safe driving behaviors and prevent or reduce the quantity of harsh driving events in the future. This can result in the increased safety of the drivers, the vehicles that the drivers operate, and other people and property. This can also result in less wear-and-tear on the vehicles or vehicle components, which can reduce costs associated with maintaining the vehicles.

FIGS. 1A-1F are diagrams of an example 100 associated with analyzing driving behavior to identify driving risks using vehicle telematics. As shown in FIGS. 1A-1F, example 100 includes a system 105 that is associated with a vehicle 110 that includes a vehicle device 115 and is associated with a user device 120. The system 105 may include one or more devices configured to analyze driving behavior to identify driving risks using vehicle telematics, as described herein.

The vehicle device 115 may include one or more sensors and/or other types of devices configured to obtain telematics data associated with a vehicle 110. For example, the vehicle device 115 may include an accelerometer, a gyroscope, a dash camera, a parking assist camera, a backup assist camera, an on-board diagnostic (OBD) device, an electronic control unit (ECU), a location device (e.g., a global navigation satellite system (GNSS) device), a brake pedal sensor configured to obtain data indicating a position and/or a change in position of a brake pedal of the vehicle 110, a gas pedal sensor configured to obtain data indicating a position and/or a change in position of a gas pedal of the vehicle 110, a steering wheel sensor configured to obtain data indicating a position and/or a change in position of a steering wheel of the vehicle 110, and/or another type of device for obtaining telematics data associated with the vehicle 110.

In some implementations, the vehicle device 115 is located on and/or in the vehicle 110. Alternatively, and/or additionally, the vehicle device 115 may be separate from the vehicle 110. For example, the vehicle device 115 may include a traffic camera positioned to capture images of a roadway traveled by the vehicle 110, a radar device positioned to capture data indicating a speed of the vehicle 110 as the vehicle 110 travels along a roadway, and/or the like.

The user device 120 may include one or more devices capable of receiving, generating, storing, processing, and/or providing telematics data associated with the vehicle 110 and/or other types of information (e.g., information identifying a user associated with user device 120 (e.g., a name, a user name, and/or another type of identifier)), information indicating whether the user is currently using the user device 120, information identifying a contact associated with the user, information identifying an address associated with the user (e.g., a home address, a work address, an address of an event the user is attending, and/or the like). For example, the user device 120 may include a wireless communication device, a mobile phone, a laptop computer, a tablet computer, a wearable communication device (e.g., a smart wristwatch, a pair of smart eyeglasses, among other examples), and/or a similar type of device.

As shown in FIG. 1A, the system 105 may receive historical telematics data. The historical telematics data may include telematics data obtained by one or more vehicle devices 115 and/or one or more user devices 120. Alternatively, and/or additionally, the historical telematics data may be artificially generated (e.g., using a machine learning model, input by a user, and/or the like) and/or obtained from a server device (e.g., a third-party server device, a server device storing a data set of historical telematics data, and/or the like). The system 105 may receive the historical telematics data periodically, based on providing a request, based on an occurrence of an event (e.g., the historical telematics data being received by another device, a user input indicating that the historical telematics data is to be provided to the system 105, and/or the like).

The historical telematics data may include acceleration data, speed data, location data, steering wheel data, gyroscope data, brake pedal data, gas pedal data, phone usage data, trip data, and/or driver data, among other examples. The acceleration data may include data obtained by an accelerometer and/or an ECU of a vehicle 110. The acceleration data may indicate an acceleration (and/or a deceleration) of a vehicle over a time period (e.g., every second, every ten seconds, and/or the like).

The speed data may include data determined based on the accelerometer data and/or data obtained by a speedometer, an ECU, a radar device, and/or the like. The speed data may indicate a speed of a vehicle at one or more instances during a trip. The location data may include data obtained by a location device and may indicate a geographic location of a vehicle.

The steering wheel data may include data obtained by a steering wheel sensor (e.g., a sensor configured to obtain data indicating an angle and/or a position and/or a change of an angle and/or position of a steering wheel of a vehicle) and/or an ECU. The steering wheel data may include data indicating an angle and/or a position of a steering wheel of a vehicle. Alternatively, and/or additionally, the steering wheel data may include data indicating a change in an angle and/or a position of a steering wheel.

The gyroscope data may include data obtained by a gyroscope. The gyroscope data may include data indicating a tilt and/or an angular velocity of a vehicle at one or more times (e.g., every second, every two seconds, every ten seconds, and/or the like) during a trip.

The brake pedal data may include data obtained by a brake pedal sensor (e.g., a sensor configured to obtain data indicating a position and/or a change of a position of a brake pedal of a vehicle) and/or an ECU. The brake pedal data may include data indicating a position and/or a change of a position of a brake pedal of a vehicle.

The gas pedal data may include data obtained by a gas pedal sensor (e.g., a sensor configured to obtain data indicating a position and/or a change of a position of a gas pedal of a vehicle) and/or an ECU. The gas pedal data may indicate a position and/or a change of a position of a gas pedal of a vehicle.

The phone usage data may include data obtained by a vehicle device 115 (e.g., data indicating that a user is utilizing a hands-free function, data received from a user device 120 indicating that the user device 120 is currently being utilized by the user, and/or the like), a user device 120 (e.g., an application associated with the system 105), and/or a network device associated with a network utilized by the user device 120. The phone usage data may include data indicating usage of a user device 120 associated with the driver of a vehicle during a trip.

In some implementations, the historical telematics data is associated with a plurality of trips (e.g., a driver driving a vehicle from a first location to a second location). The plurality of trips may be associated with one or more variables. For example, the plurality of trips may be associated with drivers having different characteristics (e.g., different ages, different genders, and/or the like), different types of trips (e.g., driving to work, driving to a store, and/or the like), different types of vehicles (e.g., a car, a truck, a bus, a delivery vehicle, and/or the like), different types of roadways (e.g., paved roads, dirt roads, highways, and/or the like), and/or different times of day (e.g., morning, evening, during rush hour, 8:00 AM, and/or the like), among other characteristics.

In some implementations, the plurality of trips includes trips taken by a particular user over a time period (e.g., a week, a month, a year, and/or the like). The system 105 may determine a set of base line parameters for the particular user based on the historical telematics data associated with the particular user, as described in greater detail below. In this way, the system 105 may customize the base line parameters to the particular user based on a driving style of the particular user. For example, if a particular user commonly begins breaking at a first distance when approaching a stop sign, the system 105 may utilize the first distance to determine whether the particular user is influenced by one or more factors (e.g., stress, drowsiness, intoxication, and/or the like).

Alternatively, and/or additionally, the plurality of trips includes trips taken by a plurality of users over a time period. The plurality of users may share one or more characteristics, such as an age, a gender, living in a same geographical region, traveling to similar locations, and/or the like.

As shown by reference number 125, the system 105 determines a set of base line driving parameters based on historical telematics data. In some implementations, the system 105 may utilize a first machine learning model to determine the set of base line driving parameters. The first machine learning model may include a classification model, such as a Bayesian classification model.

In some implementations, the system 105 generates and/or trains the first machine learning model. For example, the system 105 may generate and/or train the first machine learning model based on receiving the historical telematics data and/or prior to receiving the historical telematics data. In some implementations, the system 105 utilizes a portion of the historical telematics data to train the first machine learning model. Alternatively, and/or additionally, the system 105 may use a dataset of telematics data associated with one or more types of driving behaviors. The system 105 may obtain the dataset from a memory associated with the system 105 and/or another device (e.g., a server device storing training data for training machine learning models, a server device associated with a third-party, and/or the like). In some implementations, the system 105 trains the first machine learning model in a manner similar to that described below with respect to FIG. 4. Alternatively, and/or additionally, the system 105 may obtain a trained first machine learning model from another device.

In some implementations, the system 105 pre-processes the historical telematics data and determines the set of base line driving parameters based on the pre-processed historical telematics data. For example, the system 105 may scale sensor data obtained by different sensors to a common scale, the system 105 may time-align sensor data obtained at different intervals and/or frequencies, and/or the like.

The system 105 may identify a group of historical telematics data associated with a trip associated with a type of driving behavior based on pre-processing the historical telematics data. The system 105 may analyze the group of historical telematics data to determine a driving pattern associated with the trip and/or the type of driving behavior. The system 105 may vectorize the driving pattern to generate a single vector associated with the group of historical telematics data. The system 105 may derive a template associated with the type of driving pattern based on the vector. The system 105 may determine a set of base line parameters associated with the type of driving behavior based on the template.

The set of base line parameters may include an acceleration parameter, an angular velocity parameter, a steering wheel parameter, a brake pedal parameter, a gas pedal parameter, a location parameter, a phone usage parameter, and/or the like. The acceleration parameter may indicate a rate of acceleration (or deceleration) associated with the type of driving behavior. The angular velocity parameter may indicate an angular velocity associated with the type of driving behavior. The steering wheel parameter may indicate a position of a steering wheel, an angle of a steering wheel, a change in a position of a steering wheel, a change in an angle of a steering wheel, and/or a difference between a direction associated with a position of a steering wheel and a direction of travel associated with the type of driving behavior.

The brake pedal parameter may indicate a position of a brake pedal, an angle of a brake pedal relative to a bottom surface of a vehicle, a change in a position of a brake pedal, and/or a change in an angle of a brake pedal associated with the type of driving behavior. The gas pedal parameter may indicate a position of a gas pedal, an angle of a gas pedal relative to a bottom surface of a vehicle, a change in a position of a gas pedal, and/or a change in an angle of a gas pedal associated with the type of driving behavior. The location parameter may indicate a location associated with the set of base line parameters, a type of roadway associated with the set of base line parameters, a time of day associated with the set of base line parameters, and/or the like. The phone usage parameter may indicate whether usage of a user device 120 by a driver of a vehicle 110 is associated with the type of driving behavior.

Figure 1B:
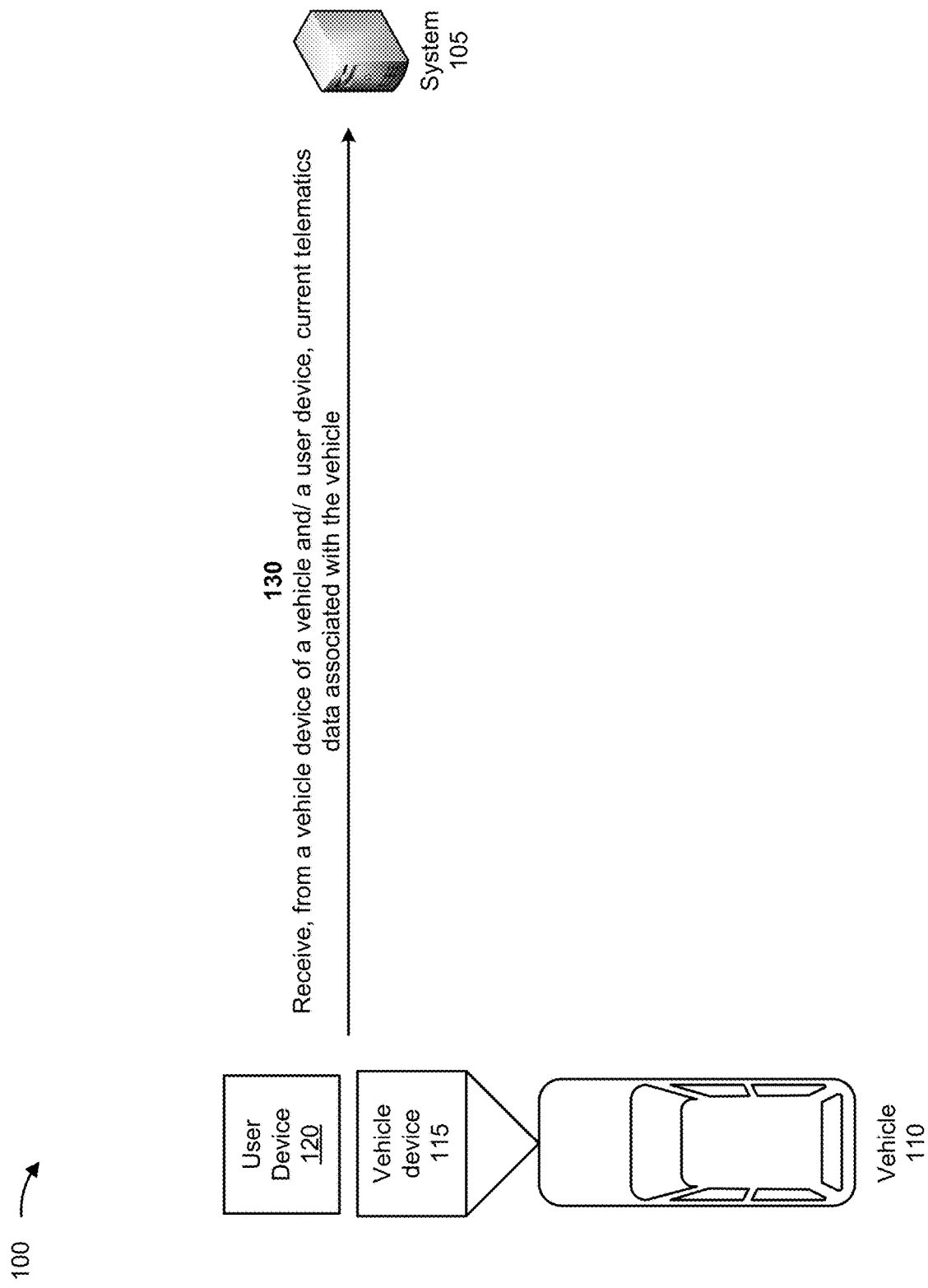

As shown in FIG. 1B, and by reference number 130, the system 105 receives, from the vehicle device 115 of the vehicle 110 and/or the user device 120, current telematics data associated with the vehicle 110. The current telematics data may include acceleration data indicating a current acceleration of the vehicle 110, speed data indicating a current speed of the vehicle 110, location data indicating a current location of the vehicle 110, steering wheel data indicating a current angle, a current position, a change in an angle, a rate of change in an angle, a change in a position, and/or a rate of change in a position of a steering wheel of the vehicle 110, gyroscope data indicating a current tilt and/or angular velocity of the vehicle 110, brake pedal data indicating a current position, a current angle, a change in a position, a rate of change in a position, a change of an angle, and/or a rate of change of an angle of a brake pedal of the vehicle 110, gas pedal data indicating a current position, a current angle, a change in a position, a rate of change in a position, a change of an angle, and/or a rate of change of an angle of a gas pedal of the vehicle 110, and/or phone usage data indicating a usage of a user device 120 associated with a driver of the vehicle 110.

As shown in FIG. 1C, and by reference number 135, the system 105 utilizes the first machine learning model to determine a set of current driving parameters based on the set of current telematics data. In some implementations, the system 105 pre-processes the set of current telematics data based on receiving the set of current telematics data. For example, the system 105 may pre-process the set of current telematics data in a manner similar to that described above with respect to pre-processing the set of historical telematics data.

In some implementations, the system 105 determines that a portion of the set of current telematics data is missing and/or corrupted. The system 105 may identify a missing portion of the set of current telematics data based on a frequency at which the set of current telematics data was obtained by a sensor device associated with the vehicle 110. The system 105 may determine a value of the missing portion of the set of current telematics data based on one or more other portions of the set of current telematics data.

In some implementations, the system 105 removes noisy data from the set of current telematics data based on receiving the current telematics data. In some implementations, the system 105 removes the noisy data prior to pre-processing the set of current telematics data.

The system 105 may group the pre-processed set of current telematics data into one or more portions based on the types of data included in the set of current telematics data. For example, the system 105 may group the pre-processed set of current telematics data into a portion of acceleration data, a group of gyroscope data, a group of steering wheel data, a group of brake pedal data, a group of gas pedal data, a group of location data, a group of phone usage data, and/or the like. The system 105 may vectorize a portion of the pre-processed current telematics data to generate a single vector associated with the portion of the pre-processed current telematics data. The system 105 may provide the vector to the first machine learning model as an input. The first machine learning model may analyze the vector to determine a current driving parameter (e.g., an acceleration parameter, a gyroscope parameter, a steering wheel parameter, a brake pedal parameter, a gas pedal parameter, a location parameter, a phone usage parameter, and/or the like), of the set of current driving parameters, associated with the portion of the pre-processed current telematics data. The system 105 may determine a current driving parameter associated with each portion of the pre-processed set of current telematics data in a similar manner.

Figure 1D:
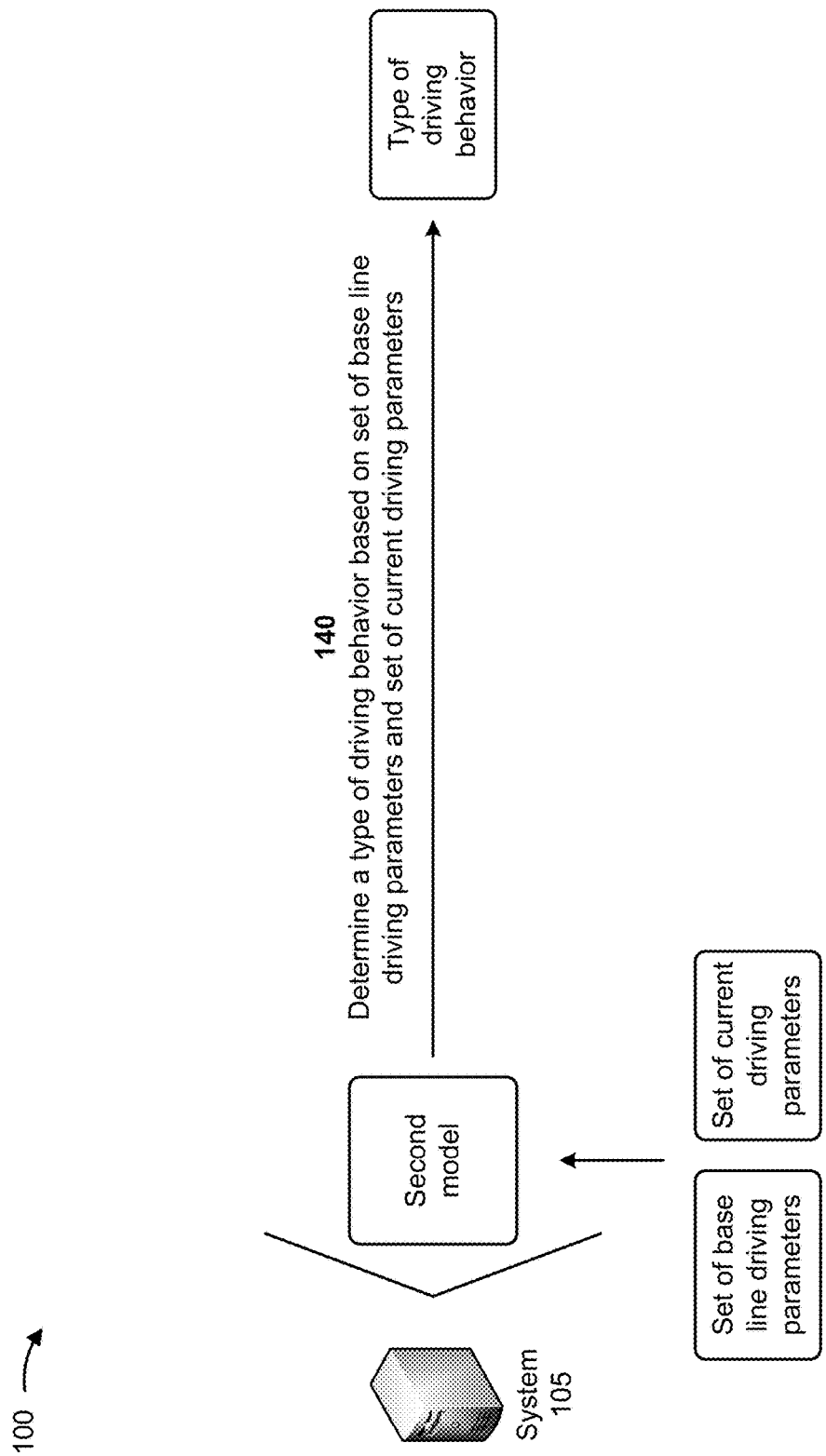

As shown in FIG. 1D, and by reference number 140, the system 105 utilizes a second machine learning model to determine a type of driving behavior based on the set of base line driving parameters and the set of current driving parameters. In some implementations, the system 105 generates and/or trains the second machine learning model prior to determining the type of driving behavior. The system 105 may generate and/or train the second machine learning model in a manner similar to that described above with respect to the first machine learning model and/or in a manner similar to that described below with respect to FIG. 4.

The type of driving behavior may be a driving behavior associated with a harsh driving event, an erratic lane change, phone usage, fatigue, stress, intoxication, drowsiness, single-hand driving, safe driving, unsafe driving, and/or the like. In some implementations, the system 105 determines the type of driving behavior based on determining a difference between a current driving parameter and a corresponding base line driving parameter. The system 105 may determine whether the difference between the current driving parameter and the base line driving parameter satisfies one or more criteria (e.g., satisfies a difference threshold).

The system 105 may determine the one or more criteria based on a template associated with the base line driving parameter. The template may indicate criteria associated with different types of driving behavior. The system 105 may determine a type of driving behavior associated with the current driving parameter based on the current driving parameter satisfying one or more criteria associated with the type of driving behavior. The system 105 may determine a type of driving behavior associated with each current driving parameter in a similar manner.

In some implementations, the system 105 determines the driving behavior associated with the current set of telematics data based on the driving behaviors associated with the current driving parameters. For example, the system 105 may determine the driving behavior associated with the current set of telematics data based on a quantity of the current driving parameters being associated with a particular driving behavior satisfying one or more criteria (e.g., the quantity satisfying a threshold).

Figure 1E:
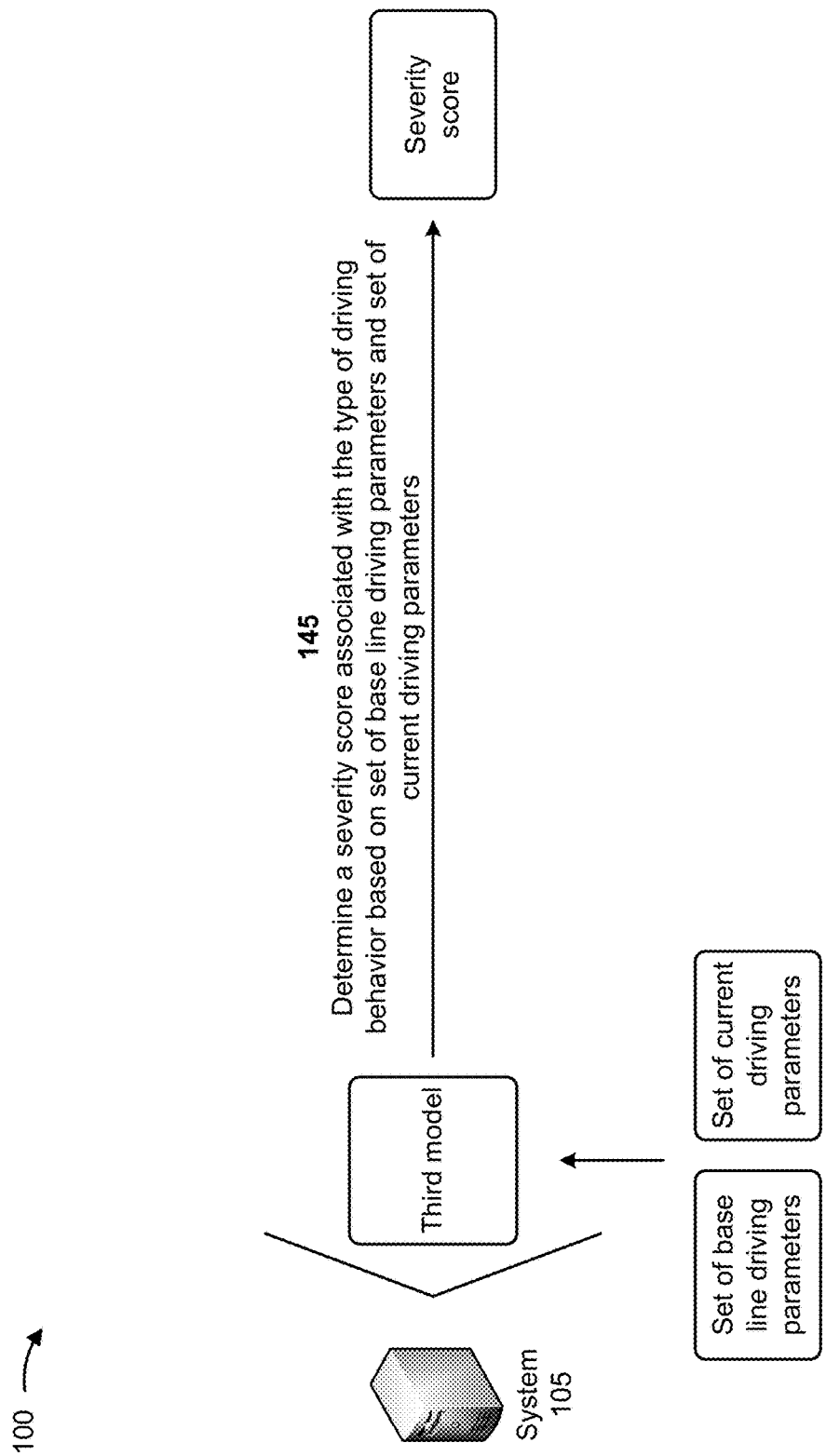

As shown in FIG. 1E, and by reference number 145, the system 105 may utilize a third machine learning model to determine a severity score associated with the type of driving behavior based on the set of base line driving parameters and the set of current driving parameters. In some implementations, the system 105 generates and/or trains the third machine learning model prior to determining the severity score. The system 105 may generate and/or train the third machine learning model in a manner similar to that described above with respect to the first machine learning model and/or in a manner similar to that described below with respect to FIG. 4.

The system 105 may determine the severity score based on a value of one or more current driving parameters. The system 105 may determine a severity score for each current driving parameter based on a respective set of criteria associated with each current driving parameter. As an example, the system 105 may determine that the severity score for a current driving parameter comprises a first value based on the current driving parameter satisfying a first threshold. The system 105 may determine that the severity score comprises a second value based on the current driving parameter satisfying a second, different threshold. The system 105 may determine that the severity score comprises a third value based on the current driving parameter satisfying a third threshold. The third threshold may be different from the first threshold and the second threshold. The system 105 may determine a severity score for each current driving parameter in a similar manner.

The system 105 may determine a severity score associated with the type of driving behavior based on one or more severity scores determined for the set of current driving parameters. For example, the system 105 may determine the severity score based on an average of the severity scores determined for the set of current driving parameters, a greatest severity score of the severity scores determined for the set of current driving parameters, and/or the like.

In some implementations, the system 105 may adjust the severity score based on one or more driving conditions. For example, the system 105 may adjust (e.g., increase) the severity score based on a road condition (e.g., icy, unpaved, wet, and/or the like) of a roadway and/or a weather condition (e.g., snow, rain, hail, and/or the like), among other examples.

Figure 1F:
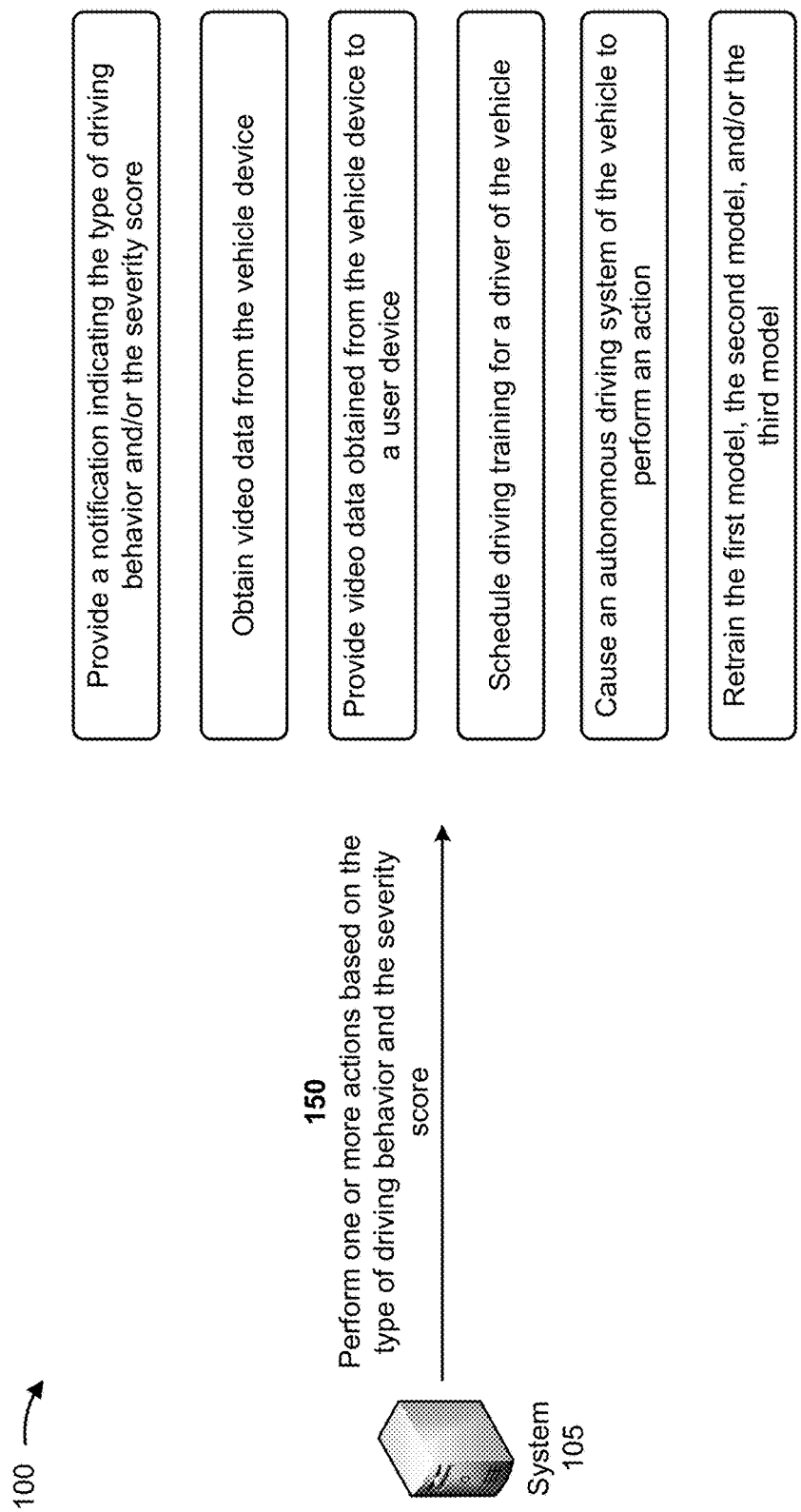

As shown in FIG. 1F, and by reference number 150, the system performs one or more actions based on the type of driving behavior and/or the severity score. In some implementations, performing the one or more actions includes the system providing a notification indicating the type of driving behavior and/or the severity score. In some implementations, the notification is provided to a vehicle device 115 and/or a user device 120 associated with a driver of the vehicle, a fleet manager associated with the vehicle, a user associated with the driver of the vehicle (e.g., an emergency contact, a user specified by the driver of the vehicle 110, a next of kin, and/or the like), a law enforcement agency, and/or the like. The notification may include an audible notification (e.g., a sound, a spoken message, and/or the like) and or a visual notification (e.g., information identifying the type of driving behavior, the severity score, a recommended action (e.g., pull over and rest, slow down, and/or speed up, among other examples)) provided via a display of the vehicle device 115 and/or the user device 120.

In some implementations, the system 105 may provide the notification to a vehicle device 115 associated with another vehicle 110 and/or a user device 120 associated with a driver of the other vehicle 110. The system 105 may determine a current location of the vehicle 110 based on the location data included in the current telematics data and/or based on the location parameter. The system 105 may identify another vehicle 110 within a pre-defined distance (e.g., 500 meters, one mile, and/or the like) of the current location of the second vehicle based on current telematics data received from a vehicle device 115 associated with the other vehicle 110 and/or a user device 120 associated with a driver of the vehicle 110. The system 105 may provide information identifying the type of driving behavior and the current location of the vehicle 110 to the vehicle device 115 associated with the other vehicle 110 and/or the user device 120 associated with the driver of the other vehicle 110 based on the type of driving behavior (e.g., intoxication, drowsiness, and/or the like), based on the severity score satisfying a score threshold, and/or based on the other vehicle 110 being within the pre-defined distance of the current location of the vehicle 110. In this way, the system 105 may alert drivers in the vicinity of the vehicle 110 of an unsafe driving behavior (e.g., intoxication), a distracted driving behavior (e.g., phone usage), and/or the like being exhibited by the driver of the vehicle 110.

In some implementations, performing the one or more actions includes the system 105 obtaining video data from the vehicle device 115 and/or providing the video data to a user device 120. For example, the system 105 may obtain video data from the vehicle device 115 and/or may provide the video data to a user device 120 (e.g., a user device of a fleet manager, a law enforcement agency, an emergency contact, an insurance provider, and/or the like) based on the type of driving behavior comprising a particular type of driving behavior (e.g., intoxication, erratic lane change, and/or a harsh driving event, among other examples) and/or based on the severity score satisfying one or more criteria. In this way, the system 105 may provide video data associated with the driver exhibiting the particular type of driving behavior that can be used as evidence (e.g., in case of an accident), training material, and/or the like.

In some implementations, performing the one or more actions includes the system 105 scheduling driver training for a driver of the vehicle 110. For example, the system 105 may schedule driving training for a driver of the vehicle 110 based on the particular type of driving behavior (e.g., phone usage, erratic lane change, and/or a harsh driving event, among other examples) and/or based on the severity score satisfying one or more criteria.

In some implementations, performing the one or more actions includes the system 105 causing an autonomous driving system of the vehicle 110 to perform an action. For example, the system 105 may cause an autonomous driving system of the vehicle 110 to perform an action (e.g., slow down, stop, change lanes, turn off the engine, and/or the like) based on the type of driving behavior comprising a particular type of driving behavior (e.g., intoxication, drowsiness, stress, fatigue, erratic lane change, and/or a harsh driving event, among other examples) and/or based on the severity score satisfying one or more criteria. As an example, for a particular type of driving behavior (e.g., intoxication), the system 105 may perform a first action (e.g., notify a law enforcement agency) based on the occurrence of the particular type of driving behavior (e.g., without considering the severity score). In some implementations, the system 105 may determine to perform one or more second actions (e.g., notify an emergency contact of a driver of the vehicle, cause an autonomous driving system to perform an action, and/or the like) based on whether the severity score satisfies the one or more criteria.

In some implementations, performing the one or more actions includes the system 105 retraining the first model, the second model, and/or the third model. The system may utilize the current telematics data, the type of driving behavior, and/or the severity score as additional training data for retraining the first machine learning model, the second machine learning model, and/or the third machine learning model, thereby increasing the quantity of training data available for training the first machine learning model, the second machine learning model, and/or the third machine learning model. Accordingly, the system may conserve computing resources associated with identifying, obtaining, and/or generating historical data for training the first machine learning model, the second machine learning model, and/or the third machine learning model relative to other systems for identifying, obtaining, and/or generating historical data for training machine learning models.

As described above, implementations described herein analyze driving behavior to identify driving risks using vehicle telematics and provide drivers with information that can be used to change the driving behavior of the drivers. Furthermore, implementations described herein are automated and can capture and process numerous (e.g., hundreds, thousands, millions, billions, and/or the like) data points to classify numerous types of driving behaviors at the same time. This can improve speed and efficiency of the process and conserve computing resources of the system 105. Furthermore, implementations described herein use a rigorous, computerized process to perform tasks or roles that were not previously performed or were previously performed using subjective human intuition or input.

Additionally, the system 105 may enable fleet managers to create safe driving training materials and/or guidelines, which can promote safe driving behaviors and prevent or reduce the quantity of harsh driving events in the future. By promoting safe driving behaviors and preventing or reducing the quantity of harsh driving events, the system 105 may increase the safety of the drivers, the vehicles that the drivers operate, and other people and property.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
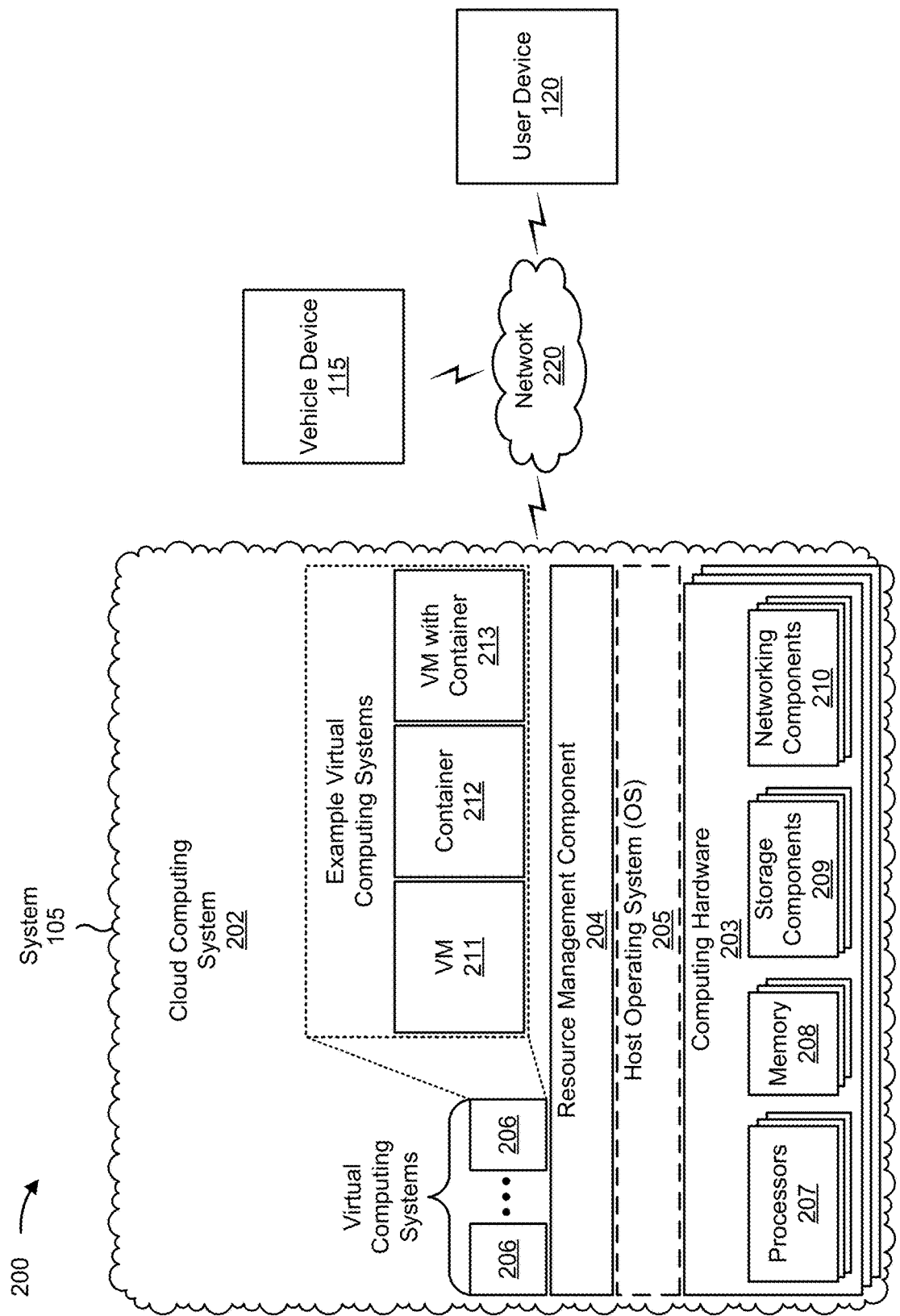
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a system 105, which may include one or more elements of and/or may execute within a cloud computing system 202. The cloud computing system 202 may include one or more elements 203-213, as described in more detail below. As further shown in FIG. 2, environment 200 may include a network 220, a vehicle device 115, and/or a user device 120. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, or a hybrid environment 213 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the system 105 may include one or more elements 203-213 of the cloud computing system 202, may execute within the cloud computing system 202, and/or may be hosted within the cloud computing system 202, in some implementations, the system 105 may not be cloud-based (e.g., may be implemented outside of a cloud computing system) or may be partially cloud-based. For example, the system 105 may include one or more devices that are not part of the cloud computing system 202, such as device 300 of FIG. 3, which may include a standalone server or another type of computing device. The system 105 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of environment 200.

The vehicle device 115 includes one or more devices capable of receiving, generating, storing, processing, and/or providing information, such as information described herein. For example, the vehicle device 115 may include a device included in vehicle 110 for obtaining data associated with the vehicle 110 traveling along a route, such as an inertial measurement unit, a three-axis accelerometer, a gyroscope, a location device, an OBD device, an ECU, a dash camera, a parking assist camera, a backup assist camera, a steering wheel sensor, a brake pedal sensor, a gas pedal sensor, and/or the like.

The user device 120 includes one or more devices capable of receiving, generating, storing, processing, and/or providing information, such as information described herein. The user device 120 may include a communication device and/or a computing device. For example, the user device 120 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
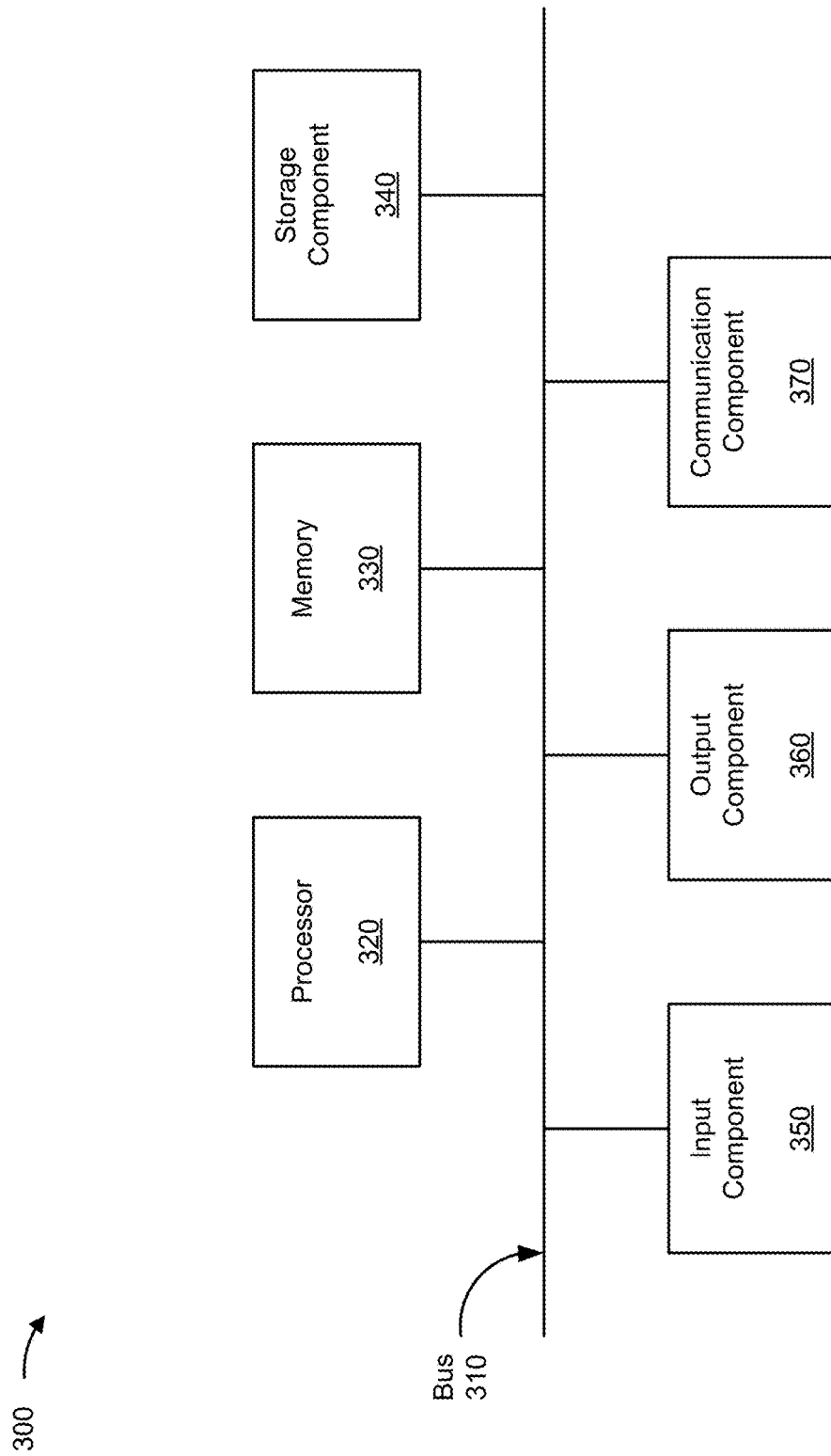
FIG. 3 is a diagram of example components of one or more devices of FIG. 2.

FIG. 3 is a diagram of example components of a device 300, which may correspond to system 105, vehicle device 115, and/or user device 120. In some implementations, system 105, vehicle device 115, and/or user device 120 may include one or more devices 300 and/or one or more components of the device 300. As shown in FIG. 3, the device 300 may include a bus 310, a processor 320, a memory 330, a storage component 340, an input component 350, an output component 360, and a communication component 370.

The bus 310 includes a component that enables wired and/or wireless communication among the components of device 300. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform a function. The memory 330 includes a random access memory, a read only memory, and/or another type of memory (e.g., a flash memory, a magnetic memory, and/or an optical memory).

The storage component 340 stores information and/or software related to the operation of device 300. For example, the storage component 340 may include a hard disk drive, a magnetic disk drive, an optical disk drive, a solid state disk drive, a compact disc, a digital versatile disc, and/or another type of non-transitory computer-readable medium. The input component 350 enables the device 300 to receive input, such as user input and/or sensed inputs. For example, the input component 350 may include a touch screen, a keyboard, a keypad, a mouse, a button, a microphone, a switch, a sensor, a global positioning system component, an accelerometer, a gyroscope, and/or an actuator. The output component 360 enables the device 300 to provide output, such as via a display, a speaker, and/or one or more light-emitting diodes. The communication component 370 enables the device 300 to communicate with other devices, such as via a wired connection and/or a wireless connection. For example, the communication component 370 may include a receiver, a transmitter, a transceiver, a modem, a network interface card, and/or an antenna.

The device 300 may perform one or more processes described herein. For example, a non-transitory computer-readable medium (e.g., the memory 330 and/or the storage component 340) may store a set of instructions (e.g., one or more instructions, code, software code, and/or program code) for execution by the processor 320. The processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
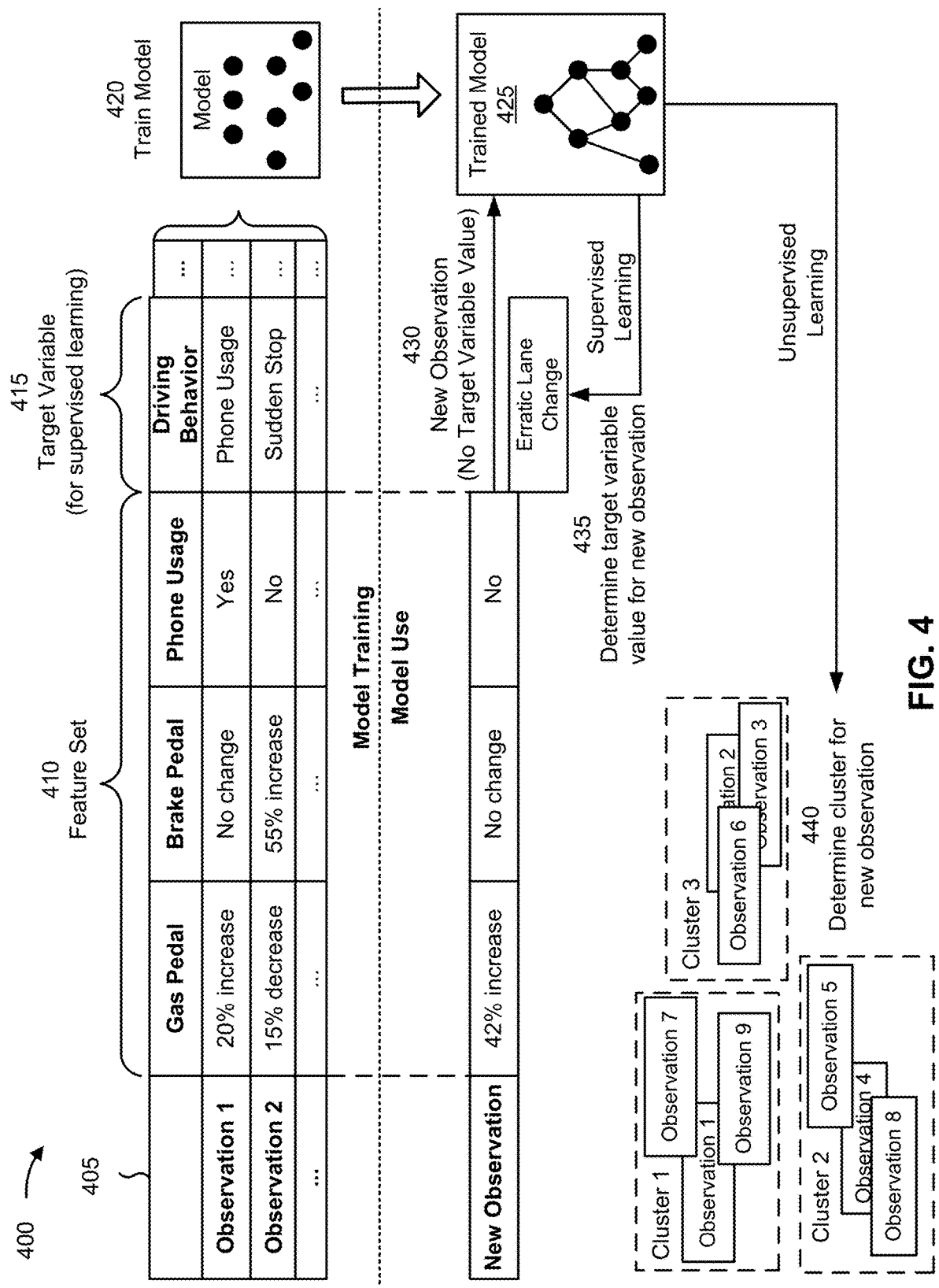
FIG. 4 is a diagram illustrating an example of training and using a machine learning model in connection with analyzing driving behavior to identify driving risks using vehicle telematics.

FIG. 4 is a diagram illustrating an example 400 of training and using a machine learning model in connection with analyzing driving behavior to identify driving risks using vehicle telematics. The machine learning model training and usage described herein may be performed using a machine learning system. The machine learning system may include or may be included in a computing device, a server, a cloud computing environment, or the like, such as the system 105 described in more detail elsewhere herein.

As shown by reference number 405, a machine learning model may be trained using a set of observations. The set of observations may be obtained from training data (e.g., historical data), such as data gathered during one or more processes described herein. In some implementations, the machine learning system may receive the set of observations (e.g., as input) from system 105, as described elsewhere herein.

As shown by reference number 410, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from system 105. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of gas pedal indicating a change in a position of a gas pedal of a vehicle, a second feature of brake pedal indicating a change in a position of a brake pedal of a vehicle, a third feature of phone usage indicating whether a driver of a vehicle was using a user device, and so on. As shown, for a first observation, the first feature may have a value indicating a 20% increase, the second feature may have a value indicating no change, the third feature may have a value of "yes", and so on. These features and feature values are provided as examples, and may differ in other examples. For example, the feature set may include one or more of the following features: an acceleration of a vehicle, a position of a steering wheel of a vehicle, a change in a position of a steering wheel of a vehicle, a location of a vehicle, a type of road on which the vehicle is traveling, a current weather condition, and/or the like.

As shown by reference number 415, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 400, the target variable is driving behavior, which has a value of phone usage for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 420, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 425 to be used to analyze new observations.

As shown by reference number 430, the machine learning system may apply the trained machine learning model 425 to a new observation, such as by receiving a new observation and inputting the new observation to the trained machine learning model 425. As shown, the new observation may include a first feature of gas pedal, a second feature of brake pedal, a third feature of phone usage, and so on, as an example. The machine learning system may apply the trained machine learning model 425 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 425 may predict a value of erratic lane change for the target variable of driving behavior for the new observation, as shown by reference number 435. Based on this prediction, the machine learning system may provide a first recommendation, may provide output for determination of a first recommendation, may perform a first automated action, and/or may cause a first automated action to be performed (e.g., by instructing another device to perform the automated action), among other examples.

In some implementations, the trained machine learning model 425 may classify (e.g., cluster) the new observation in a cluster, as shown by reference number 440. The observations within a cluster may have a threshold degree of similarity. As an example, if the machine learning system classifies the new observation in a first cluster (e.g., a phone usage cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., an intoxication cluster), then the machine learning system may provide a second (e.g., different) recommendation (e.g., a recommendation to notify an emergency contact of a driver of a vehicle) and/or may perform or cause performance of a second (e.g., different) automated action, such as automatically notify a law enforcement agency.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to analyze driving behavior to identify driving risks using vehicle telematics. The machine learning system enables recognition and/or identification of tens, hundreds, thousands, or millions of features and/or feature values for tens, hundreds, thousands, or millions of observations, thereby increasing accuracy and consistency and reducing delay associated with analyzing driving behavior to identify driving risks using vehicle telematics relative to requiring computing resources to be allocated for tens, hundreds, or thousands of operators to manually analyze driving behavior to identify driving risks using vehicle telematics using the features or feature values.

As indicated above, FIG. 4 is provided as an example. Other examples may differ from what is described in connection with FIG. 4.

Figure 5:
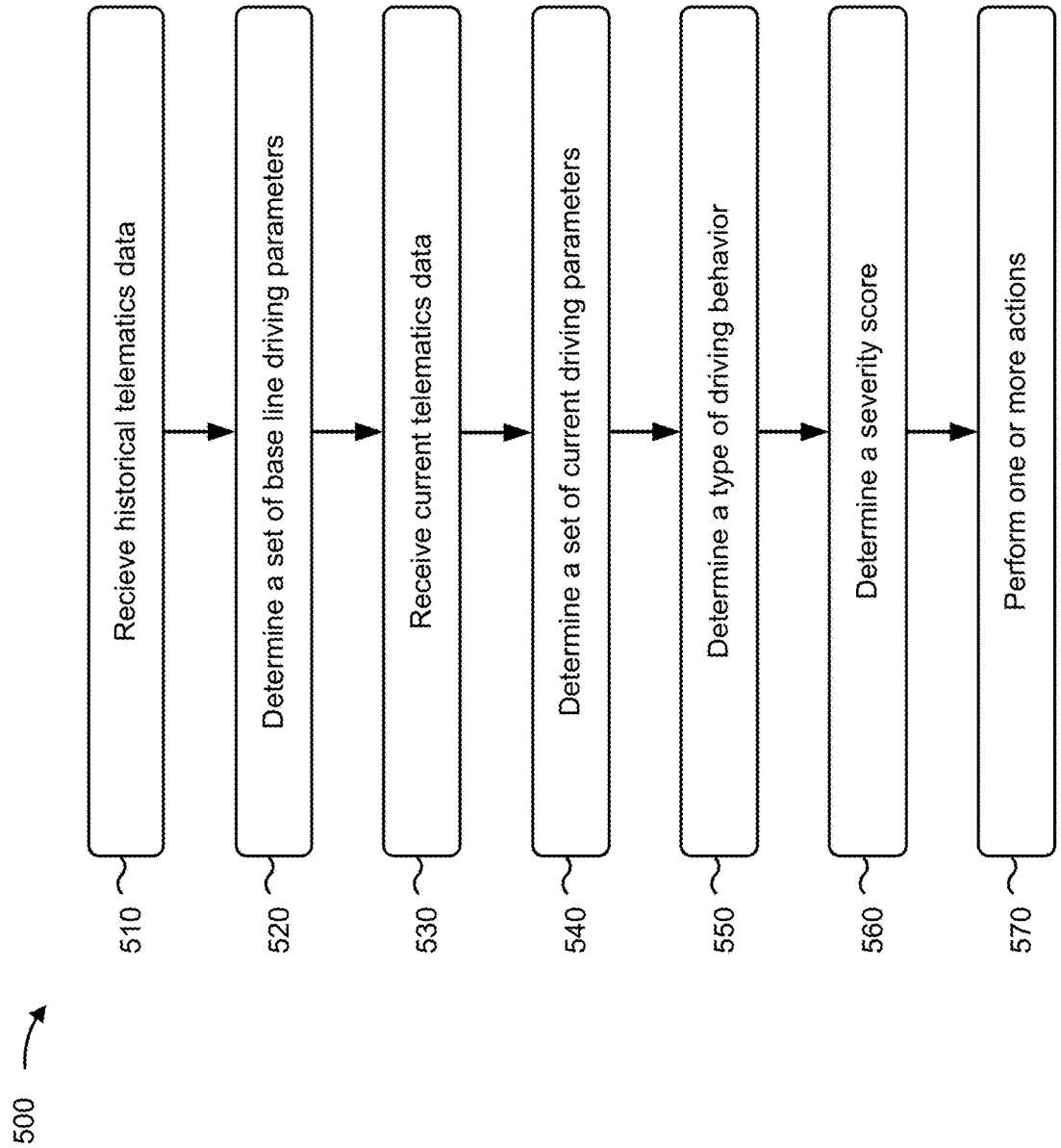
FIG. 5 is a flowchart of an example process relating to analyzing driving behavior to identify driving risks using vehicle telematics.

FIG. 5 is a flowchart of an example process 500 associated with analyzing driving behavior to identify driving risks using vehicle telematics. In some implementations, one or more process blocks of FIG. 5 may be performed by a device (e.g., the system 105). In some implementations, one or more process blocks of FIG. 5 may be performed by another device or a group of devices separate from or including the device, such as a vehicle device (e.g., the vehicle device 115) and/or a user device (e.g., the user device 120). Additionally, or alternatively, one or more process blocks of FIG. 5 may be performed by one or more components of device 300, such as the processor 320, the memory 330, the storage component 340, the input component 350, the output component 360, and/or the communication component 370.

As shown in FIG. 5, process 500 may include receiving historical telematics data (block 510). For example, the device may receive historical telematics data associated with a first vehicle, as described above. The historical telematics data may include historical accelerometer data indicating an acceleration of the first vehicle, historical gyroscope data indicating an angular velocity of the second vehicle, historical steering wheel data indicating a position of a steering wheel of the second vehicle, historical brake pedal data indicating a position of a brake pedal of the second vehicle, historical gas pedal data indicating a position of a gas pedal of the second vehicle, historical location data indicating a location associated with the current telematics data, and/or historical phone usage data indicating usage of a user device by a driver of the second vehicle.

In some implementations, the device may generate (e.g., prior to receiving the historical telematics data) a first machine learning model, a second machine learning model, and/or a third machine learning model. The first machine learning model may be configured to determine driving parameters (e.g., a set of base line driving parameters and/or a set of current driving parameters) based on processing telematics data. The second machine learning model may be configured to determine a type of driving behavior based on the driving parameters. The third machine learning model may be configured to determine a severity score associated with the type of driving behavior.

As further shown in FIG. 5, process 500 may include determining a set of base line driving parameters (block 520). For example, the device may determine a set of base line driving parameters based on processing the historical telematics data. In some implementations, the device may pre-process the historical telematics data. For example, the device may scale sensor data obtained by different sensors to a common scale, time-align sensor data obtained at different intervals and/or frequencies, and/or the like.

In some implementations, the device may identify a group of historical telematics data associated with a trip associated with a type of driving behavior based on pre-processing the historical telematics data. The device may analyze the group of historical telematics data to determine a driving pattern associated with the trip and/or the type of driving behavior. The device may vectorize the driving pattern to generate a single vector associated with the group of historical telematics data. The device may derive a template associated with the type of driving pattern based on the vector. The device may determine the set of base line parameters associated with the type of driving behavior based on the template. In some cases, the processing may be performed with a first machine learning model, as described above.

As further shown in FIG. 5, process 500 may include receiving current telematics data (block 530). For example, the device may receive current telematics data associated with a second vehicle, as described above. The current telematics data may include acceleration data indicating a current acceleration of the second vehicle, speed data indicating a current speed of the second vehicle, location data indicating a current location of the second vehicle, steering angle data indicating a current angle of a steering wheel of the second vehicle, gyroscope data indicating a current tilt of the second vehicle, brake pedal data indicating a current position and/or a change of a position of a brake pedal of the second vehicle, gas pedal data indicating a current position and/or a change of a position of a gas pedal of the second vehicle, and/or phone usage data indicating a usage of a user device associated with the driver of the second vehicle.

In some implementations, the current telematics data may include a plurality of data packets. The plurality of data packets may include telematics data captured periodically by one or more sensor devices associated with the second vehicle. For example, the plurality of data packets may include telematics data captured periodically by an accelerometer associated with the second vehicle, a gyroscope associated with the second vehicle, a location device configured to obtain data indicating a location of the second vehicle, a steering wheel sensor device configured to obtain data indicating a position of the steering wheel, a brake pedal sensor device configured to obtain data indicating a position of the brake pedal, and/or a gas pedal sensor device configured to obtain data indicating a position of the gas pedal.

As further shown in FIG. 5, process 500 may include determining a set of current driving parameters (block 540). For example, the device may determine a set of current driving parameters based on processing the current telematics data with the first machine learning model, as described above.

In some implementations, the current telematics data may include first data received from a first sensor device associated with the second vehicle and second data received from a second sensor device associated with the second vehicle. The device may scale the first data and the second data to a common scale. The device may convert a portion of the current telematics data received from a sensor device associated with the second vehicle (e.g., the first sensor device and/or the second sensor device) into a single vector. The device may determine a driving parameter, of the current set of driving parameters, based on utilizing the first machine learning model to analyze the single vector.

In some implementations, the device may determine a rate of change of a steering wheel angle of a steering wheel associated with the second vehicle based on the current telematics data. The rate of change of the steering wheel may be associated with the type of driving behavior. The device may determine the set of current driving parameters based on the rate of change of the steering wheel angle.

In some implementations, the device may determine, based on the current telematics data and for a first time period, a rate of change of a steering wheel angle of a steering wheel of the second vehicle, a rate of change of a position of a gas pedal of the second vehicle, a rate of change of a position of a brake pedal of the second vehicle, an acceleration of the second vehicle; and/or a difference between a direction of travel associated with the steering wheel angle of the steering wheel and a trajectory of the second vehicle.

Alternatively, and/or additionally, the device may identify a missing portion of the current telematics data based on a frequency at which the current telematics data was obtained by a sensor device associated with the second vehicle. The device may determine a value of the missing portion of the current telematics data based on one or more other portions of the current telematics data. The device may determine the current set of driving parameters based on determining the value of the missing portion of the current telematics data.

In some implementations, the device may remove noisy data from the current telematics data based on receiving the current telematics data and to generate reduced current telematics data. The device may process the reduced current telematics data with the first machine learning model to generate the current set of driving parameters.

As further shown in FIG. 5, process 500 may include determining a type of driving behavior (block 550). For example, the device may determine, based on processing the set of base line driving parameters and the set of current driving parameters with a second machine learning model, a type of driving behavior of a driver of the second vehicle, as described above. The type of driving behavior of the driver of the second vehicle may be associated with a harsh driving event, an erratic lane change, phone usage, fatigue, stress, intoxication, drowsiness, and/or single-hand driving.

In some implementations, the device may determine that a current driving parameter, of the set of current driving parameters, satisfies one or more criteria associated with the type of driving behavior. The device may determine the type of driving behavior based on the current driving parameter satisfying the one or more criteria.

As further shown in FIG. 5, process 500 may include determining a severity score (block 560). For example, the device may determine, based on processing the set of base line driving parameters and the set of current driving parameters with a third machine learning model, a severity score associated with the type of driving behavior, as described above.

The device may determine that the severity score comprises a first value based on a current driving parameter, of the set of current driving parameters, satisfying a first threshold. The device may determine that the severity score comprises a second value based on the current driving parameter satisfying a second threshold. The second threshold may be different from the first threshold. The device may determine that the severity score comprises a third value based on the current driving parameter satisfying a third threshold. The third threshold may be different from the first threshold and the second threshold. The device may perform the one or more actions (described below) based on the current driving parameter satisfying the first threshold, the second threshold, and/or the third threshold.

As further shown in FIG. 5, process 500 may include performing one or more actions (block 570). For example, the device may perform one or more actions based on the type of driving behavior and/or the severity score. In some implementations, performing the one or more actions includes the device providing a first notification indicating the type of driving behavior to a user device associated with the driver of the second vehicle, providing, to a user device associated with a governmental authority, a second notification indicating the type of driving behavior, the severity score, and a current location of the second vehicle, or providing video data from a camera device associated with the second vehicle to a user device associated with an emergency contact of the driver.

Alternatively, and/or additionally, performing the one or more actions may include the device determining a current location of the second vehicle based on location data included in the current telematics data. The device may identify a third vehicle within a distance of the current location of the second vehicle. The device may provide information identifying the type of driving behavior and the current location of the second vehicle to a vehicle device associated with the third vehicle based on the severity score satisfying a score threshold and based on the third vehicle being within the distance of the current location of the second vehicle.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, by a device, historical telematics data associated with a first vehicle;
    determining, by the device, a set of base line driving parameters based on the historical telematics data;
    receiving, by the device, current telematics data associated with a second vehicle;
    identifying, by the device, a missing portion of the current telematics data based on a frequency at which the current telematics data was obtained by a sensor device associated with the second vehicle;
    determining, by the device, a value of the missing portion of the current telematics data based on one or more other portions of the current telematics data;
    determining, by the device and based on determining the value of the missing portion of the current telematics data, a set of current driving parameters based on processing the current telematics data;
    determining, by the device and based on the set of base line driving parameters and the set of current driving parameters, a type of driving behavior of a driver of the second vehicle,
        wherein a harsh driving event is based on the type of driving behavior;
    determining, by the device and based on the set of base line driving parameters and the set of current driving parameters, a severity score associated with the type of driving behavior; and
    performing, by the device, one or more actions based on the type of driving behavior and the severity score.

2. The method of claim 1, wherein performing the one or more actions comprises one or more of:

providing a first notification indicating the type of driving behavior to a user device associated with the driver of the second vehicle;

providing, to a user device associated with a governmental authority, a second notification indicating the type of driving behavior, the severity score, and a current location of the second vehicle; or providing video data from a camera device associated with the second vehicle to a user device associated with an emergency contact of the driver.

3. The method of claim 1, wherein determining the set of current driving parameters comprises:

determining a rate of change of a steering wheel angle of a steering wheel associated with the second vehicle based on the current telematics data,
wherein the rate of change of the steering wheel is associated with the type of driving behavior; and
determining the set of current driving parameters based on the rate of change of the steering wheel angle.

4. The method of claim 1, wherein determining the set of current driving parameters comprises:

determining, based on the current telematics data and for a first time period, one or more of:
a rate of change of a steering wheel angle of a steering wheel of the second vehicle;
a rate of change of a position of a gas pedal of the second vehicle;
a rate of change of a position of a brake pedal of the second vehicle;
an acceleration of the second vehicle; or
a difference between a direction of travel associated with the steering wheel angle of the steering wheel and a trajectory of the second vehicle.

5. The method of claim 1, wherein determining the type of driving behavior comprises:

determining that a current driving parameter, of the set of current driving parameters, satisfies one or more criteria associated with the type of driving behavior; and
determining the type of driving behavior based on the current driving parameter satisfying the one or more criteria.

6. The method of claim 1, wherein determining the type of driving behavior comprises:

determining the type of driving behavior based on processing the set of base line driving parameters and the set of current driving parameters with a first machine learning model; and
wherein determining the severity score comprises:
determining the severity score based on processing the set of base line driving parameters and the set of current driving parameters with a second machine learning model.

7. The method of claim 1, wherein determining the severity score comprises one or more of:

determining that the severity score comprises a first value based on a current driving parameter, of the set of current driving parameters, satisfying a first threshold;
determining that the severity score comprises a second value based on the current driving parameter satisfying a second threshold,
wherein the second threshold is different from the first threshold; or
determining that the severity score comprises a third value based on the current driving parameter satisfying a third threshold,
wherein the third threshold is different from the first threshold and the second threshold.

8. A device, comprising:

one or more processors configured to:
generate, based on historical telematics data associated with a first vehicle, a set of base line driving parameters;
receive current telematics data associated with a second vehicle,
wherein the current telematics data includes one or more of:
accelerometer data indicating an acceleration of the second vehicle,
gyroscope data indicating an angular velocity of the second vehicle,
steering wheel data indicating a position of a steering wheel of the second vehicle,
brake pedal data indicating a position of a brake pedal of the second vehicle,
gas pedal data indicating a position of a gas pedal of the second vehicle,
location data indicating a location associated with the current telematics data, or
phone usage data indicating usage of a user device by a driver of the second vehicle;
identify a missing portion of the current telematics data based on a frequency at which the current telematics data was obtained by a sensor device associated with the second vehicle;
determine a value of the missing portion of the current telematics data based on one or more other portions of the current telematics data;
generate, based on determining the value of the missing portion of the current telematics data, a set of current driving parameters associated with the second vehicle;
determine, based on the set of base line driving parameters and the set of current driving parameters, a type of driving behavior of a driver of the second vehicle,
wherein a harsh driving event is based on the type of driving behavior;
determine, based on the set of base line driving parameters and the set of current driving parameters, a severity score associated with the type of driving behavior; and
perform one or more actions based on the type of driving behavior and the severity score.

9. The method of claim 1, wherein the type of driving behavior includes at least one of:

phone usage,
fatigue,
stress,
intoxication,
drowsiness, or
single-handed driving.

10. The device of claim 8, wherein the current telematics data includes a plurality of data packets, wherein the plurality of data packets include telematics data captured periodically by one or more sensor devices associated with the second vehicle,
wherein the one or more sensor devices associated with the second vehicle include the sensor device associated with the second vehicle, and
wherein the one or more sensor devices associated with the second vehicle include one or more of:
an accelerometer associated with the second vehicle,
a gyroscope associated with the second vehicle,
a location device configured to obtain data indicating a location of the second vehicle, a steering wheel sensor device configured to obtain data indicating a position of the steering wheel, a brake pedal sensor device configured to obtain data indicating a position of the brake pedal, or a gas pedal sensor device configured to obtain data indicating a position of the gas pedal.

11. The device of claim 8, wherein the one or more processors are further configured to:

remove noisy data from the current telematics data based on receiving the current telematics data and to generate reduced current telematics data; and wherein the one or more processors, when generating the current set of driving parameters, are configured to:

process the reduced current telematics data with a machine learning model to generate the current set of driving parameters.

12. The device of claim 8, wherein the current telematics data includes first data received from the sensor device associated with the second vehicle and second data received from a second sensor device associated with the second vehicle, and wherein the one or more processors are further configured to:

scale the first data and the second data to a common scale.

13. The device of claim 8, wherein the one or more processors, when generating the current set of driving parameters, are configured to:

convert a portion of the current telematics data into a single vector; and determine a driving parameter, of the current set of driving parameters, based on utilizing a machine learning model to analyze the single vector.

14. The device of claim 8, wherein the type of driving behavior includes at least one of:

phone usage, fatigue, stress, intoxication, drowsiness, or single-handed driving.

15. A non-transitory computer-readable medium storing a set of instructions, the set of instructions comprising:

one or more instructions that, when executed by one or more processors of a device, cause the device to:

receive historical telematics data associated with a first vehicle;

generate, based on the historical telematics data, a set of base line driving parameters;

receive current telematics data associated with a second vehicle;

identify a missing portion of the current telematics data based on a frequency at which the current telematics data was obtained by a sensor device associated with the second vehicle; and determine a value of the missing portion of the current telematics data based on one or more other portions of the current telematics data;

generate, based on determining the value of the missing portion of the current telematics data, a set of current driving parameters associated with the second vehicle;

determine, based on the set of base line driving parameters and the set of current driving parameters, a type of driving behavior of a driver of the second vehicle, wherein a harsh driving event is based on the type of driving behavior;

determine, based on the set of base line driving parameters and the set of current driving parameters, a severity score associated with the type of driving behavior; and perform one or more actions based on the type of driving behavior and the severity score.

16. The non-transitory computer-readable medium of claim 15, wherein the one or more instructions further cause the device to:

determine that the severity score satisfies a score threshold, wherein the one or more actions are performed based on the severity score satisfying the score threshold.

17. The non-transitory computer-readable medium of claim 15, wherein the one or more instructions, that cause the device to perform the one or more actions, cause the device to:

determine a current location of the second vehicle based on location data included in the current telematics data;

identify a third vehicle within a distance of the current location of the second vehicle; and provide information identifying the type of driving behavior and the current location of the second vehicle to a vehicle device associated with the third vehicle based on the severity score satisfying a score threshold and based on the third vehicle being within the distance of the current location of the second vehicle.

18. The non-transitory computer-readable medium of claim 15, wherein the current telematics data includes one or more of:

acceleration data indicating a current acceleration of the second vehicle, speed data indicating a current speed of the second vehicle, location data indicating a current location of the second vehicle, steering angle data indicating a current angle of a steering wheel of the second vehicle, gyroscope data indicating a current tilt of the second vehicle, brake pedal data indicating a current position of a brake pedal of the second vehicle, gas pedal data indicating a current position of a gas pedal of the second vehicle, or phone usage data indicating a usage of a mobile device associated with the driver of the second vehicle.

19. The non-transitory computer-readable medium of claim 15, wherein the current telematics data includes a plurality of data packets, wherein the plurality of data packets include telematics data captured periodically by the sensor device associated with the second vehicle.

20. The non-transitory computer-readable medium of claim 15, wherein the one or more instructions further cause the device to:

remove noisy data from the current telematics data based on receiving the current telematics data, wherein the current telematics data is processed by a machine learning model to generate the set of current driving parameters based on removing the noisy data from the current telematics data.

* * * * *